(No Model.)
W. ARNOLD.
WASHING APPARATUS.
No. 518,087. Patented Apr. 10, 1894.
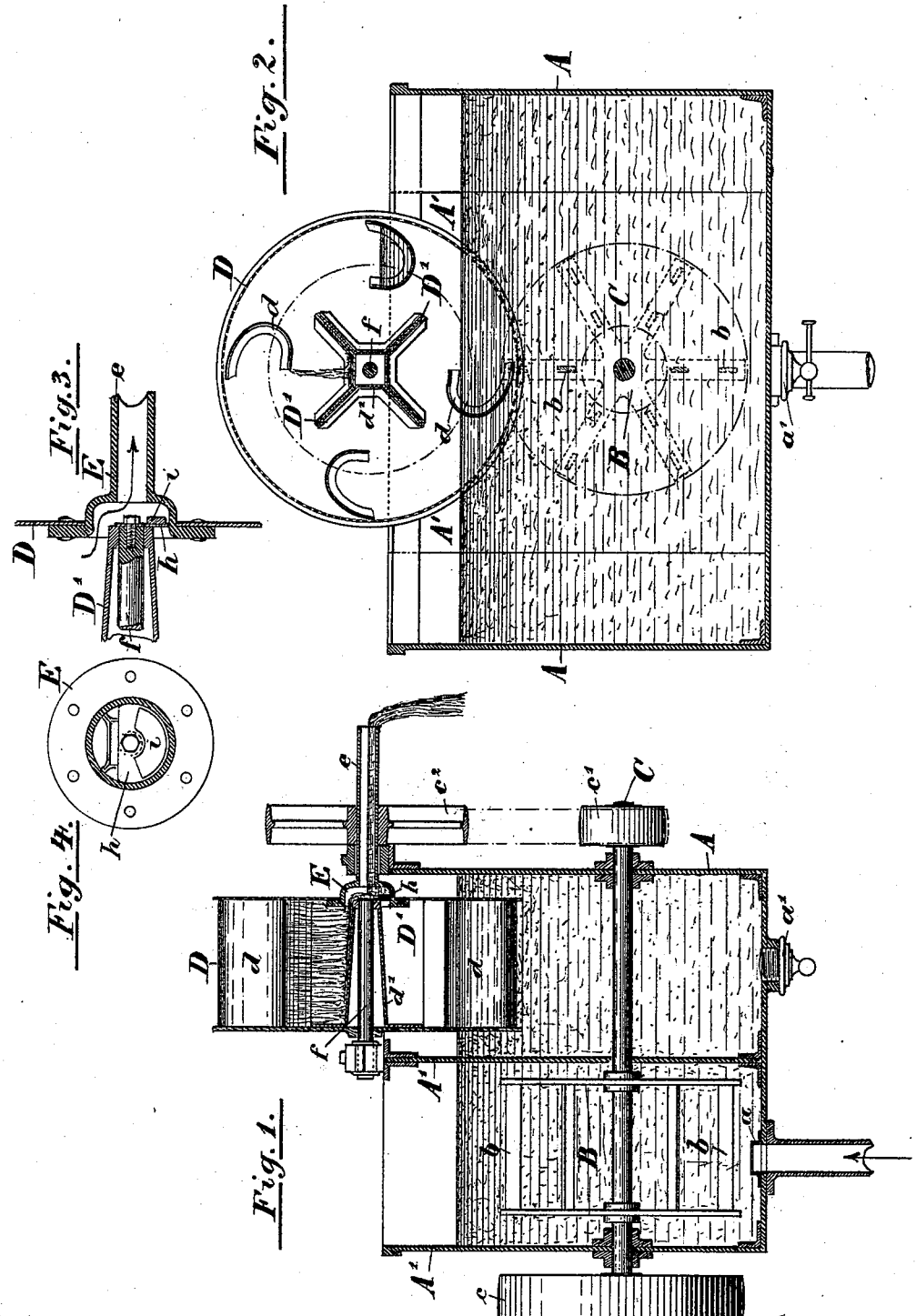
Witnesses:
M. C. Massie.
A. J. Birney.
Inventor:
Wilhelm Arnold
By Max Hengi
Atty.

UNITED STATES PATENT OFFICE.

WILHELM ARNOLD, OF GABLENBURG, NEAR STUTTGART, GERMANY.

WASHING APPARATUS.

SPECIFICATION forming part of Letters Patent No. 518,087, dated April 10, 1894.

Application filed October 18, 1893. Serial No. 488,467. (No model.)

*To all whom it may concern:*

Be it known that I, WILHELM ARNOLD, of Gablenburg, near Stuttgart, Wurtemberg, Germany, have invented a new and useful Apparatus for Washing Filter Materials, of which the following is a specification.

The present invention is designed for the cleansing of filtering-masses by means of a continuous supply of fresh water and a continual drawing off of the dirty water.

The apparatus is represented in the accompanying drawings in Figures 1 and 2 in two vertical sections at right angles to each other. Figs. 3 and 4 are represented on a somewhat enlarged scale, and represent the discharge of the dirty water from the baling device.

The oblong receptacle, A, is divided into two sections or compartments, by a partition, A', similarly to a hollander, the two sections being in communication, inasmuch as the partition does not extend entirely through. In one of the sections of the receptacle, A, is arranged the agitator or stirring device, B, mounted upon the shaft, C, and driven by means of a belt pulley, c, or in any other suitable manner, and located entirely below the water-level. Fresh water is continually supplied, under pressure, through the opening, a, in the bottom of vessel, A. In the other section of the receptacle, A, is arranged a baling device, D, of peculiar construction, and consisting of two closed side walls and a perforated periphery, which serves as a straining device. Within this periphery are arranged a number of scoops or buckets, d, which dip into the liquid or bath, and are thereby filled with the dirty water, and raise the same on the further revolution of the baling cylinder, but leave the filter material in the receptacle, by reason of the perforated periphery, or straining device. At a certain point in the rotation of the baling cylinder, the buckets, or scoops, d, empty their contents, which are caught up at the proper time by one of the troughs or conduits, D', which are arranged concentrically around the axle of rotation of the cylinder, the water thus deposited flowing into the hollow axle, E, in consequence of the inclination of the bottom, d', of the trough, D', toward the said hollow axle, E. The number of troughs corresponds to that of the buckets, d, of the baling cylinder, and their location with respect to the same is such, that the side walls of the troughs extend obliquely upward for a sufficient time after the corresponding bucket has been emptied, to allow all the water to run off only into the hollow axle. The hollow axle, E, is attached by its flange to one of the side walls of D, provided with an opening, the said axle being considerably enlarged at that point. This hollow axle does not extend through the baling cylinder, but only to the said side wall, the straight part, e, of the hollow axle forming one journal of the baling cylinder, D. The other journal is formed by a short solid shaft, f, which, at one end, is attached to the second side wall of D, and, at the other end, which extends into the hollow axle, E, bears a ring for laterally closing the troughs, D', toward the shaft, f. (See Fig. 3.) A round valve or trap, h, cut away in a straight line at the top, is loosely suspended from the forward end of the shaft, f, which extends into the hollow axle, E, the said trap being packed or forming a tight closure at the lower part of the enlarged chamber of the hollow shaft, E. To enable the valve or trap to maintain this position when the shaft, f, revolves, a weight, i, is riveted to the same at the bottom. In consequence of the upper cut-away portion of the valve, h, the water can flow off from the troughs, D', into the enlarged chamber of the hollow axle, E, but is prevented from flowing back by valve, h, and thus compelled to escape through the hollow shaft, e. The baling cylinder is actuated by a belt from belt pulley, c', mounted on shaft, C, the said belt running over the pulley, c².

The new washing apparatus possesses the advantages of a continual discharge of the dirty water, while, at the same time, fresh water is continually supplied, and the filter-material is continually agitated, the said filter-material, however, remaining in the apparatus while the water is being drawn off. When the filter-material has been completely purified, the water is drained from the apparatus, and the filter material removed.

What I claim, and desire to secure by Letters Patent, is—

In a baling device, a rotary drum provided with a number of peripheral scoops, in combination with a hollow shaft communicating with the interior of the drum, a number of inclined troughs arranged below the scoops and around the axle of the drum, and a valve suspended from the axle of the drum for closing off the lower part of the said drum, substantially as set forth.

In testimony whereof I have signed this specification in the presence of two subscribing witnesses.

WILHELM ARNOLD.

Witnesses:
AUGUST B. DRANTZ,
THEODORE F. FEGEN.